United States Patent

Gantner et al.

(10) Patent No.: US 8,002,238 B2
(45) Date of Patent: Aug. 23, 2011

(54) VALVE HAVING A SEALING MEMBER

(75) Inventors: Urs Gantner, Mels (CH); Bernhard Litscher, Buchs (CH)

(73) Assignee: VAT Holding AG, Haag (CH)

( * ) Notice: Subject to any disclaimer, the term of this patent is extended or adjusted under 35 U.S.C. 154(b) by 46 days.

(21) Appl. No.: 12/618,261

(22) Filed: Nov. 13, 2009

(65) Prior Publication Data

US 2010/0117018 A1    May 13, 2010

Related U.S. Application Data

(63) Continuation of application No. PCT/EP2008/003168, filed on Apr. 19, 2008.

(30) Foreign Application Priority Data

May 16, 2007 (DE) .......................... 10 2007 023 339

(51) Int. Cl.
*F16K 25/00*    (2006.01)
(52) U.S. Cl. ......... 251/203; 251/193; 251/279; 251/326
(58) Field of Classification Search ................... 251/193, 251/203, 204, 279, 326, 58
See application file for complete search history.

(56) References Cited

U.S. PATENT DOCUMENTS

| | | | | |
|---|---|---|---|---|
| 3,185,435 A | | 5/1965 | Hauser | |
| 3,352,535 A | * | 11/1967 | Power | 251/204 |
| 4,044,993 A | * | 8/1977 | Wheeler | 251/158 |
| 4,328,947 A | | 5/1982 | Reimpell et al. | |
| 4,470,576 A | | 9/1984 | Schertler | |
| 4,560,141 A | | 12/1985 | Bosch | |
| 4,718,637 A | * | 1/1988 | Contin | 251/158 |
| 4,921,213 A | | 5/1990 | Geiser | |
| 5,003,943 A | * | 4/1991 | Lafferty, Sr. | 123/198 D |
| 6,629,682 B2 | | 10/2003 | Duelli | |
| 6,685,163 B2 | | 2/2004 | Blecha | |
| 6,688,577 B2 | * | 2/2004 | Abbott | 251/30.02 |
| 6,896,239 B1 | * | 5/2005 | Brenes | 251/92 |
| 7,011,294 B1 | | 3/2006 | Ehrne et al. | |

FOREIGN PATENT DOCUMENTS

| | | |
|---|---|---|
| DE | 45641 | 1/1889 |
| DE | 261942 | 7/1913 |
| DE | 534163 | 9/1931 |
| DE | 709220 | 8/1941 |
| DE | 924143 | 2/1955 |
| DE | 1937366 | 1/1970 |
| DE | 2229501 | 6/1972 |

(Continued)

*Primary Examiner* — John Fristoe, Jr.
(74) *Attorney, Agent, or Firm* — Frommer Lawrence & Haug LLP

(57) ABSTRACT

A valve has a closure member for closing a valve orifice, particularly so as to be tight against gas, in a closed position of the closure member. The closure member can be moved in a closing process by at least one actuator starting from a first position of maximum opening at least along a first partial distance with a linear movement component in direction of its closed position, and the actuator carries out a closing stroke with a linear stroke direction for a movement of the closure member with this movement component. The actuator is so arranged in relation to the closure member that an angle diverging from 0° and 180° is provided between the linear movement component of the closure member along the first partial distance, proceeding from the first position of maximum opening, and the linear stroke direction of the actuator.

17 Claims, 6 Drawing Sheets

FOREIGN PATENT DOCUMENTS

| | | |
|---|---|---|
| DE | 2218407 | 10/1973 |
| DE | 7601246 | 5/1976 |
| DE | 2627607 | 1/1977 |
| DE | 2634885 | 2/1978 |
| DE | 2708540 | 8/1978 |
| DE | 3209217 | 9/1983 |
| DE | 3224387 | 1/1984 |
| GB | 149855 | 8/1920 |
| GB | 1392347 | 4/1975 |
| JP | 58-121387 | 7/1983 |
| JP | 60222670 | 11/1985 |
| JP | 6241344 | 8/1994 |

\* cited by examiner

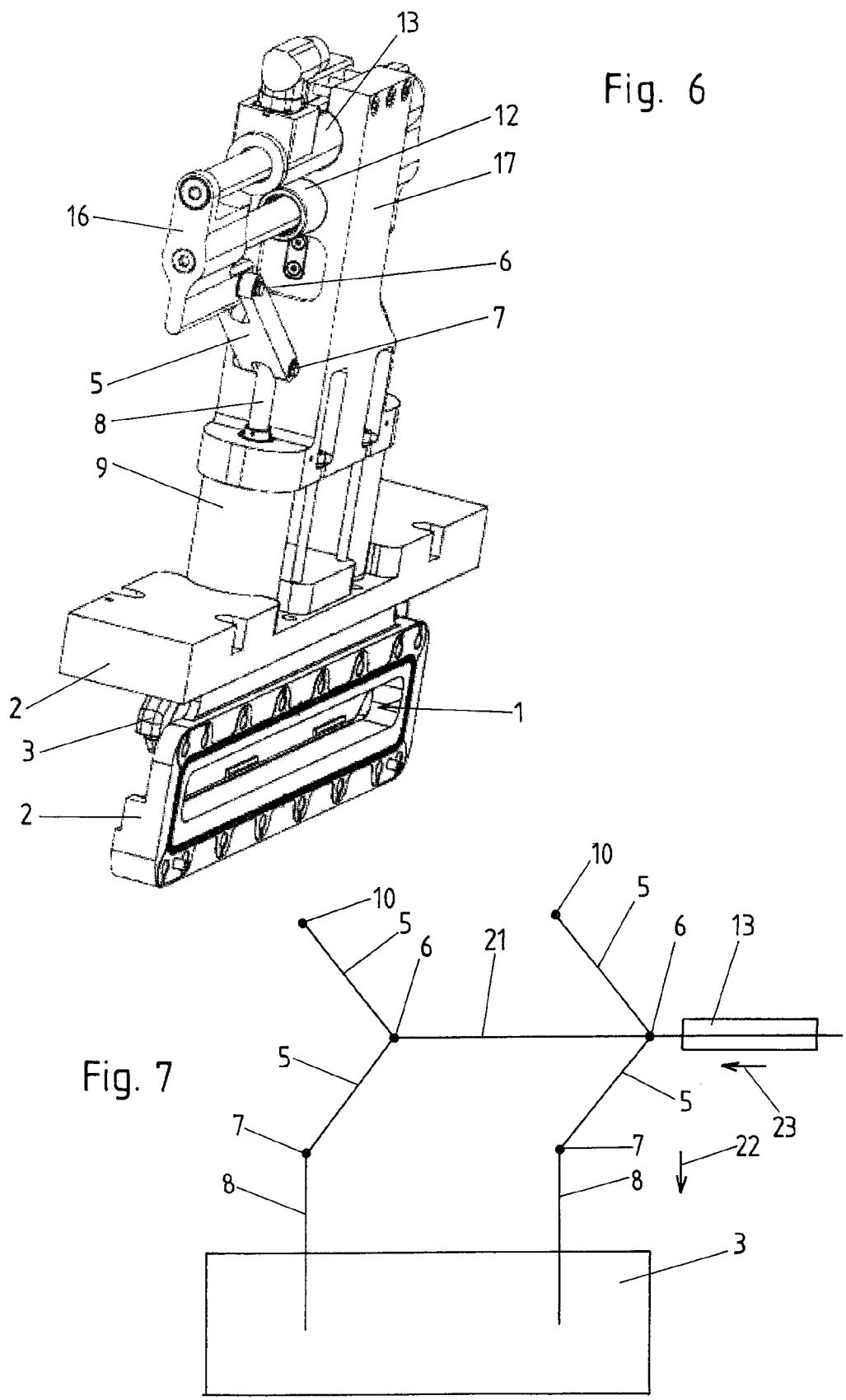

VALVE HAVING A SEALING MEMBER

The present application is a continuation of PCT Patent Application No. PCT/EP2008/003168 filed on Apr. 19, 2008, which claims priority from German Patent Application No. 10 2007 023 339.8 filed on May 16, 2007, the disclosure of which is incorporated herein by reference in its entirety.

BACKGROUND OF THE INVENTION

1. Field of the Invention

The present invention is directed to a valve having a closure member for closing a valve orifice, particularly so as to be tight against gas, in a closed position of the closure member, wherein the closure member can be moved in a closing process by at least one actuator starting from a first position of maximum opening at least along a first partial distance with a linear movement component in direction of its closed position, and the actuator carries out a closing stroke with a linear stroke direction for a movement of the closure member with this movement component.

2. Description of Related Art

Generic valves are used, for example, in semiconductor fabrication or semiconductor machining, to carry out individual machining steps in a gastight manner in closed environments which are substantially emptied of air (i.e., vacuum environments). Often, these valves are also called vacuum valves. They are also frequently referred to as slide valves because the closure member of the valve is displaced along its path from the maximum open position to the closed position in a linear manner at least partially. As a matter of principle in such valves, care must be taken that a seal which is usually arranged at the closure member, or at the seat surface of the valve corresponding to it, is not loaded transverse to its longitudinal direction after the closure member has made contact with the sealing surface. Such shear stresses on the seals are generally acknowledged as being very detrimental to the longevity of the seal. To prevent this, various type of closure members have been developed in the prior art which are movable at least partially in a linear motion from the maximum open position to the closed position. A first group of closure members is constructed so as to be substantially wedge-shaped so that a force component presses the closure member against the seat surface perpendicular to the seat surface at the end of the closing movement of the closure member due to the wedge effect. Closure members in this type of embodiment are shown in U.S. Pat. No. 4,921,213 and U.S. Pat. No. 7,011,294. In other generic valves, the closure member is initially displaced linearly in a displacement direction by an actuator for closing the valve until the closure member is in a position in which it lies opposite to the valve orifice but so as to be raised from the valve seat. This is followed by a movement with another movement component usually oriented perpendicular to the seat surface so that the closure member is pressed against the seat surface of the valve housing. The second part of the closing movement in such slide valves is achieved in different ways. U.S. Pat. No. 6,629,682, for example, shows a generic valve in which the closure member is pressed against the seat surface of the valve housing by a tilting movement by means of another actuator. With respect to this type of valve, in which the closure member in its entirety executes an L-shaped or J-shaped movement, other variants are also known in which the closure member is pressed against the seat surface by tilting members. A design of this type is shown in DE 32 24 387.

Other variants of closure members known from the prior art are moved linearly exclusively in one direction when moving from the maximum open position into the closed position. In this case, the seat surface of the valve body is correspondingly arranged perpendicular to the movement direction of the closure member. An example is disclosed in U.S. Pat. No. 6,685,163.

It is conventional in the prior art to realize the linear movement of the closure member by means of a—usually pneumatic—piston-cylinder unit. The piston rod of this unit generally acts directly on the closure member. This has two drawbacks. First, the closing speed and opening speed that can be realized by means of these pneumatic actuators is not as high as would be desirable especially in the first movement phase. Second, the dimensions and design of these actuators must be very large in order to provide the desired closing pressures in the closed position of the closure member.

JP 6-241344 discloses a solution in which the closing stroke of the actuator, which is likewise constructed as a piston-cylinder unit, is carried out parallel to the linear closing movement of the valve body. To improve the speed and available contact pressing pressures, this reference discloses connecting the actuator to the closure member by means of gears driven by a toothed rack and arms which are eccentrically articulated at the latter. However, the construction shown in this reference is relatively complicated and requires many parts.

SUMMARY OF THE INVENTION

It is the object of the invention to provide a simple design with as few moving parts as possible for a valve of the generic type in which the fastest possible closing stroke can be realized and high closing pressures can be achieved in the closed position with actuators having relatively small dimensions.

This object is met in that the actuator is so arranged in relation to the closure member that an angle diverging from 0° and 180° is provided between the linear movement component of the closure member along the first partial distance proceeding from the first position of maximum opening and the linear stroke direction of the actuator.

By means of the arrangement of the actuator in relation to the closure member per the invention, relatively simple but efficient transmission mechanisms can be realized which make it possible to realize a high closing speed of the closure member and also sufficiently high closing forces in the closed position with comparatively small actuators. In the maximum open position, the valve orifice to be closed in the closed position is advantageously no longer covered at all by the closure member. Accordingly, when opened to the maximum degree, the closure member preferably releases the valve orifice completely or fully uncovers the valve orifice. In certain applications, however, it is also sufficient that the closure member uncovers at least 70% of the surface of the valve orifice, preferably at least 85% of the valve orifice, in the maximum open position.

For the purpose of an optimal generation of force, it is advantageous to provide an angle between 45° and 135°, preferably an angle between 80° and 100°, between the linear movement component of the closure member and the linear stroke direction of the actuator.

In especially preferred constructional variants, an angle of 90° (i.e., a right angle) is provided between the linear movement component of the closure member and the linear stroke direction of the actuator.

The directions of the linear movement components and the linear stroke direction are advantageously given by respective correspondingly shaped guides.

In preferred variants for converting the linear stroke movement of the actuator into a closing movement with a linear movement component, at least one arm for transmitting the closing stroke of the actuator to the closure member is rotatably connected to the actuator by a first articulation point and to the closure member by a second articulation point.

The closure member can be rotatably connected directly to the corresponding arm. However, in gastight valves in particular, more preferable constructional variants provide an indirect articulation of the arm at the closure member in that the latter is preferably rigidly connected to at least one valve rod, and the arm is rotatably connected to the valve rod at the second articulation point. This makes it possible to guide the closure member linearly in the area of the valve rod and to seal it relative to the valve housing preferably so as to be tight against gas. In order to achieve corresponding leverage with high initial velocity during the closing movement and large forces at the end of the closing movement, the first articulation point and the second articulation point should be at a distance from one another.

The invention can be realized in principle in all of the above forms of closure members mentioned in the prior art, a common feature of which is that the closure member is movable during the closing process starting from the first position of maximum opening first along the partial distance with a linear movement component. It depends on the embodiment form of the closure member and the corresponding shape of the seat surface whether or not the closure member is moved exclusively linearly in this direction during the closing process. The invention can also be realized with closure members which are designed in such a way that, following the partial distance with a linear movement component, they can be pressed against at least one sealing seat surface with another movement component oriented at an angle diverging from 0° and 180° in relation to the linear movement component for fully achieving the closed position. Further, it is also conceivable that the closure member undergoes in the area of the above-mentioned, preferably first, partial distance with a linear movement component an additional movement component directed perpendicular to the latter. However, closure members which are movable exclusively with a linear movement component in one direction along the, preferably first, partial distance have a simpler construction and are easier to seal.

Further details and features of the invention are indicated in the following description of the drawings.

BRIEF DESCRIPTION OF THE DRAWINGS

FIGS. 1 to 6 show a preferred first embodiment example of the invention; and

FIGS. 7 to 10 show schematic drawings of different modified embodiment forms according to the invention.

DETAILED DESCRIPTION OF EMBODIMENTS

Figure 1:
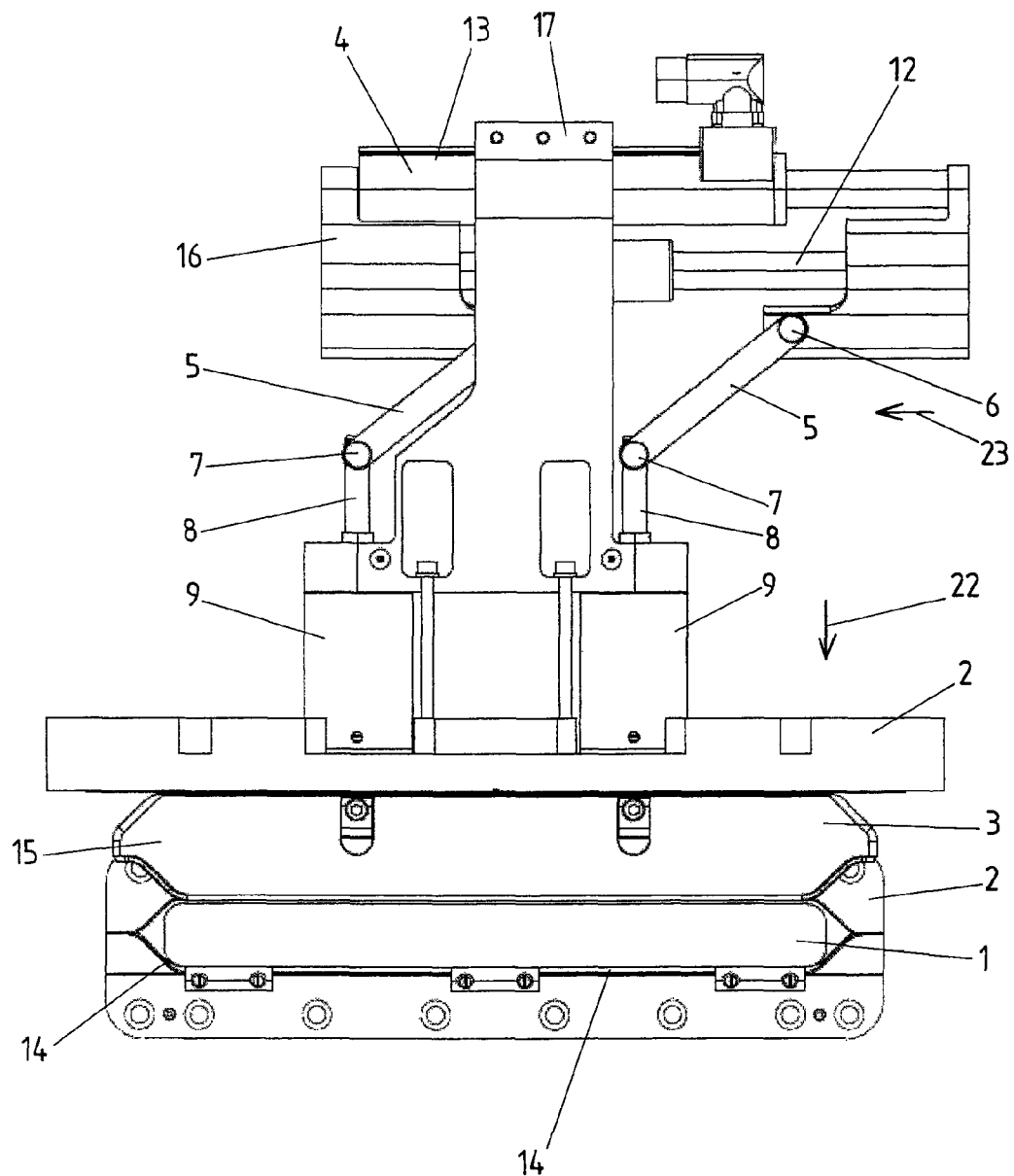

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

In the first embodiment example according to the invention, the closure member 3 is constructed in the form of a valve plate 15. During the movement from the maximum open position shown in FIG. 1 to the closed position shown in FIGS. 2 and 3, the valve plate 15 exclusively executes a linear movement with the movement component in direction 22. The opening stroke is carried out correspondingly in the direction opposite to that indicated by arrow 22. In this embodiment example, the seat surface 14 is arranged at the valve housing 2. It is constructed in the manner thoroughly described and shown in U.S. Pat. No. 6,685,163 which is referred to in this regard and which is incorporated in the disclosure of the present application by reference.

The valve orifice 1 is shown in the maximum open position in FIG. 1. This valve orifice 1 is closed by means of the closure member 3. In this embodiment example, the closure member 3 or valve plate 15 is rigidly connected to two valve rods 8. In this instance, these valve rods 8 are guided linearly in a gastight valve rod guide 9, known per se. An arm or lever 5 is rotatably articulated, respectively, at the end of the valve rods 8 opposite from the closure member 3 by the second articulation point 7. The first articulation points 6 are located at the respective ends of the arms 5 opposite to articulation point 7. The arms 5 are rotatably connected to the actuator 4 by means of these articulation points 6. This connection is realized in this variant by means of a slide 16 which can be moved by the actuator 4 between the position shown in FIG. 1 and the stroke direction 23 shown in FIG. 3 and in the opposite direction when opened. In the preferred embodiment form shown in this instance, the actuator 4 is constructed as an electromagnetic linear drive 13. Drives of this kind are known, per se. The actuator guide 12 is provided for supporting the forces to be transmitted via the arms 5 in direction 22 and extends parallel to the movement direction 23 of the linear drive 13. The axes of rotation of the first articulation points and second articulation points 7 preferably extend vertical to directions 22 and/or 23. The longitudinal axis 26 of the valve orifice 1 shown in FIG. 4 likewise preferably extends perpendicular to directions 22 and/or 23. Further, the longitudinal axis 26 advantageously forms a normal to the plane of the valve orifice 1. As is realized in the present example, the linear movement component or direction 22 and/or the linear stroke direction 23 advantageously extend(s) parallel to the plane of the valve orifice 1.

Figure 2:
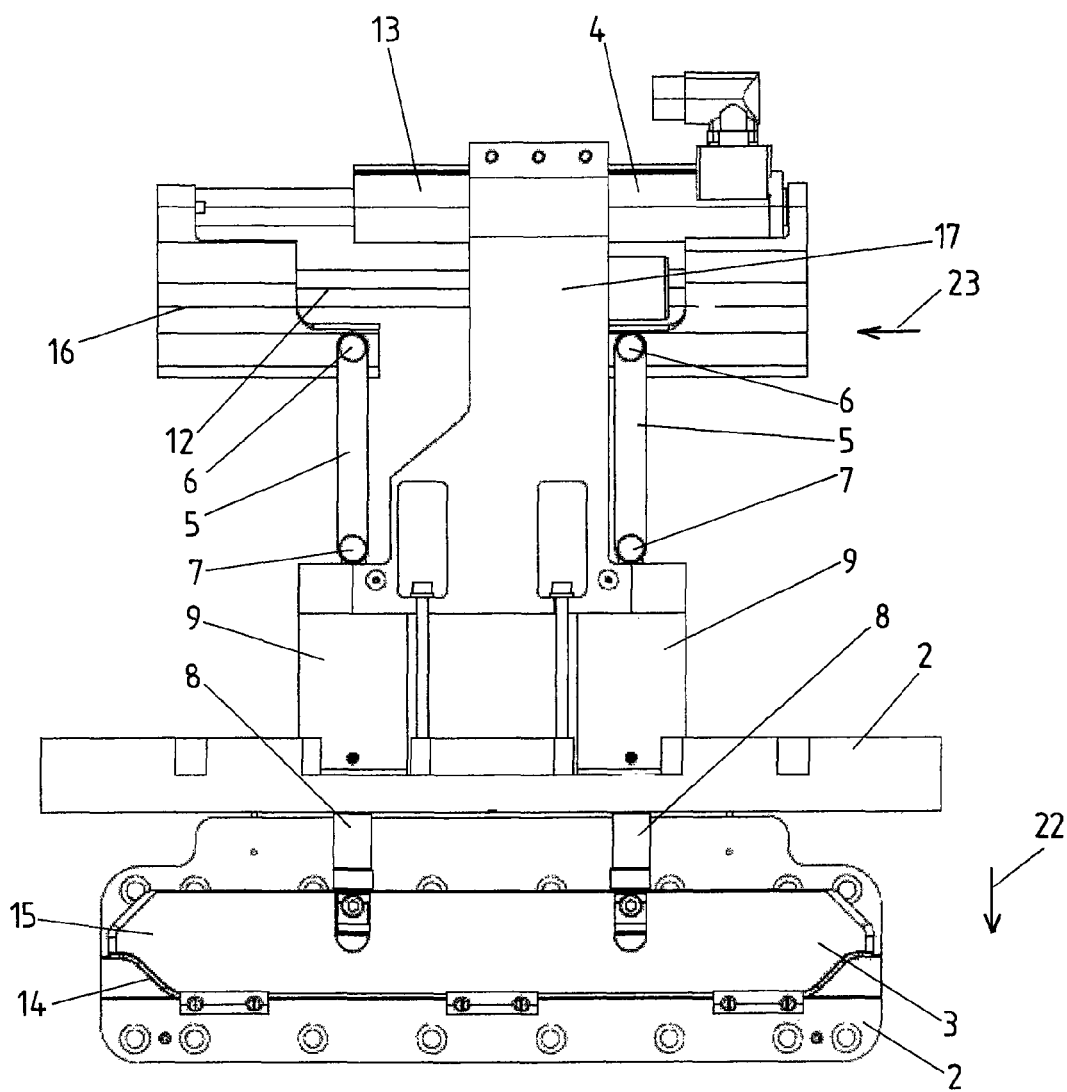
Figure 3:
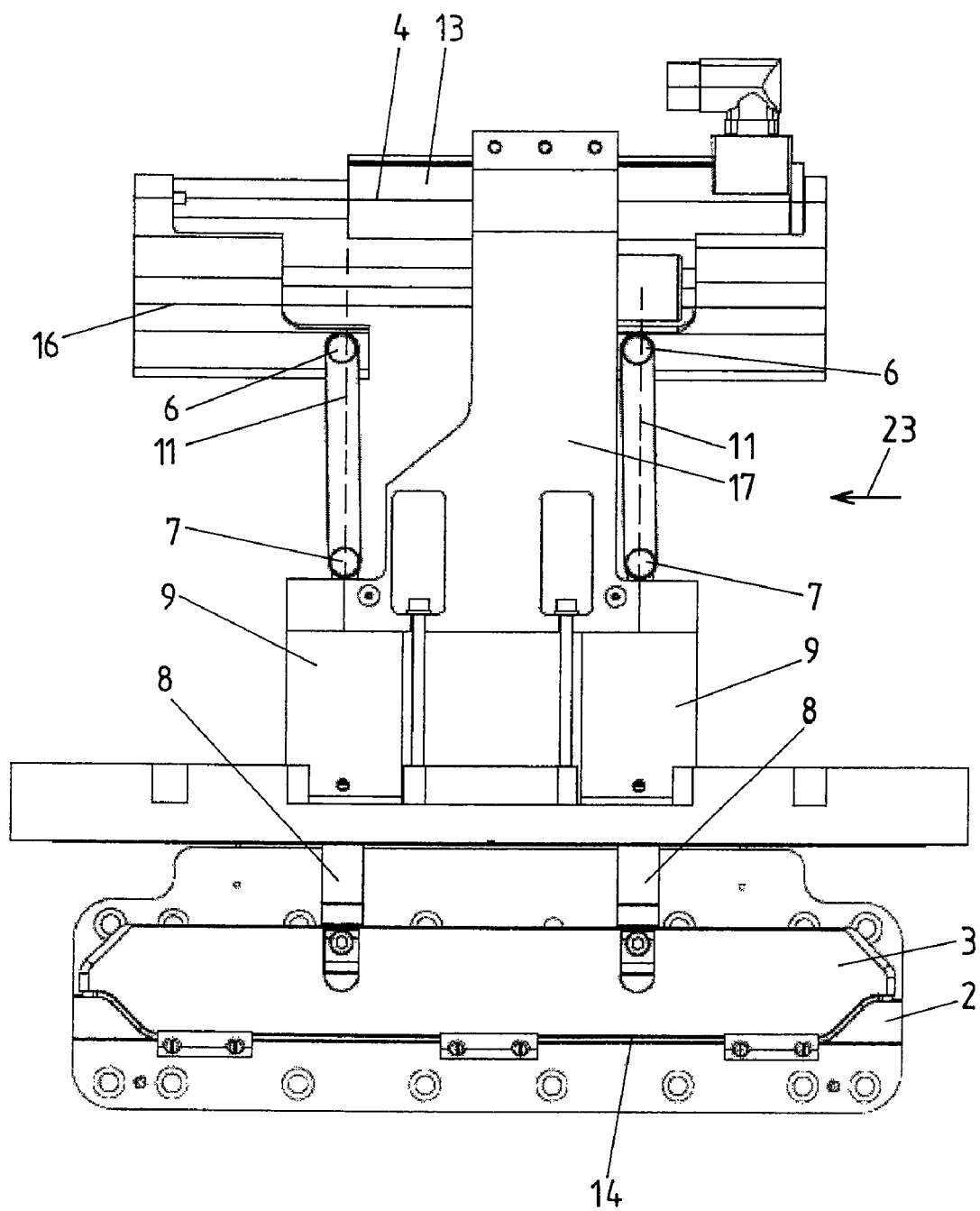

Starting from the position of maximum opening according to FIG. 1 in which there is no overlapping of the closure member 3 and valve orifice 1 in the present example, the closure member 3 is displaced into the closed position shown in FIG. 2 by means of the displacement of the slide 16. In so doing, the arms 5 press the valve rods 8 and, therefore, the valve plate 15 down on the seat surfaces 14 of the valve housing 2. The slide 16 is supported at the guide portion 17 of the valve housing 2 by the actuator guide 12 to absorb the closing forces. FIG. 3 shows a position which is realized in a preferred embodiment example of the invention. In this closed position, the closure member 3 is held in a self-locking manner. According to the present variant, this is achieved in that the arms 5 and the first articulation points 6 are moved in stroke direction 23 over their respective top dead centers. The top dead center is located in a position in which the connections of the center points of the first articulation points 6 to the center points of the respective second articulation points 7 below the latter lie exactly on the force vectors acting on them. These lines are shown in dashes in FIG. 3 and are designated by 11. In the self-locking position shown in FIG.

3, the center points of the first articulation points 6 are moved over the top dead centers lying on lines 11.

Figure 5:
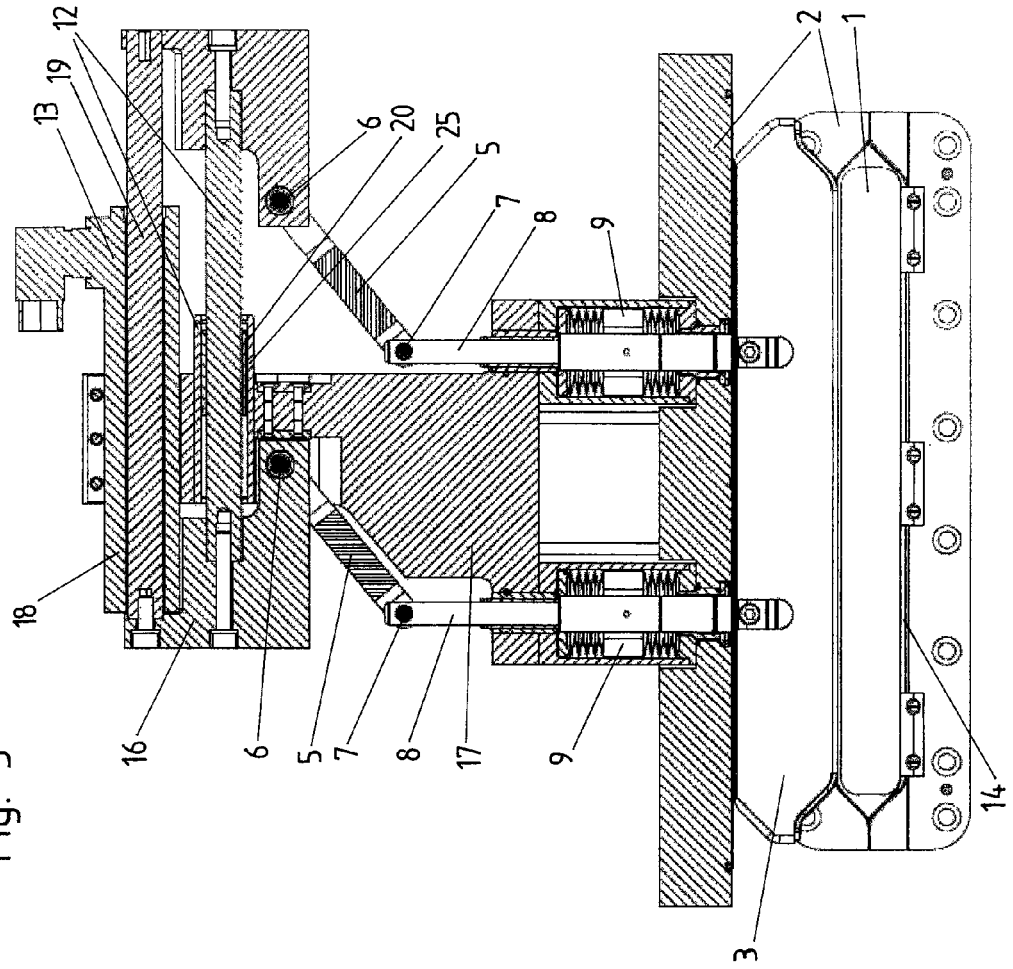
Figure 4:
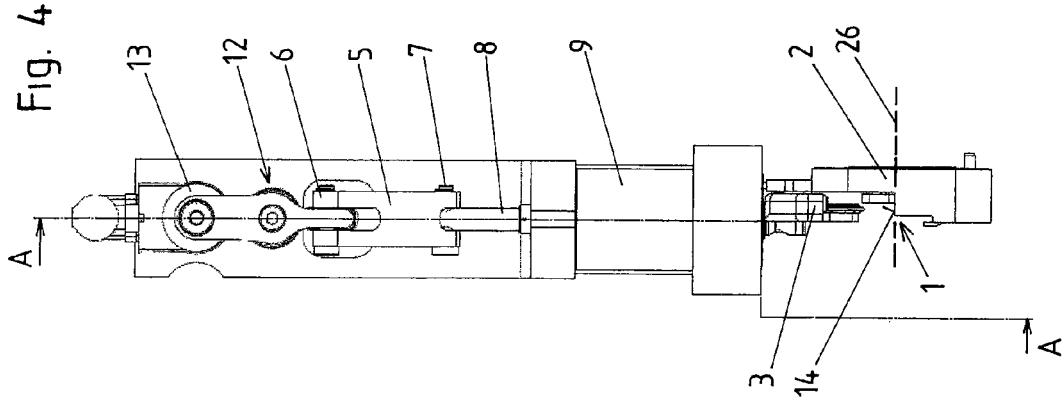

FIG. 4 shows section line A-A in a side view of the first embodiment example. FIG. 5 shows the section associated with line A-A through the embodiment example. The sleeve-shaped portion 18 of the electromagnetic linear drive 13 and the core rod 19 enclosed by this sleeve-shaped portion 18 are shown in the area of the electromagnetic linear drive 13. The electromagnetic coils of the linear drive 13, which are not shown explicitly, are advantageously arranged in the sleeve-shaped portion 18, while permanent magnets are provided in the core rod 19 as is known, per se. This facilitates the electrical connection of the electromagnets arranged in the sleeve-shape portion. The ball bearings 20 provided in the sleeve 25 which ensure the lowest possible losses through frictional forces during the displacement of the slide 16 are indicated in the area of the actuator guide 12.

FIG. 6 shows, in addition, a perspective view of the rear side of the embodiment example remote of the closure member 3.

In addition to other embodiment forms, a possible modification of the described embodiment example could consist in varying the number of arms 5 and valve rods 8 provided. It is also possible to provide only one valve rod and only one arm 5 as well as a plurality of these structural component parts. The invention also need not necessarily be realized with the preferred electromagnetic linear motor 13. Instead of this, pneumatic or hydraulic piston-cylinder units or electric motors carrying out a rotational movement can also be provided. Devices known from the prior art for converting a rotational movement into the linear stroke movement 23 must then be provided for converting the rotational movement of the electric motor. For example, these devices can be spindle gear units or rack and pinion gear units, known per se. The spindles or toothed racks then carry out a linear movement in direction 23 relative to the electric motor and the rest of the gear unit in a corresponding manner. Stepper motors are preferably used as electric motors in these variants.

FIG. 7 shows schematically how so-called toggle levers can be realized within the meaning of the invention using additional arms 5. The advantage of these toggle levers is that the forces acting opposite to direction 22 need no longer be absorbed by the linear drive 13 or a linear actuator guide 12, not shown in FIG. 7, but rather can be introduced at fixed points 10. These fixed points 10 could be arranged at the valve housing 2 or other correspondingly statically fixed structural component parts. As is shown in FIG. 7, the push rod 21 which is displaceable in direction 23 and in the opposite direction by the linear drive 13 is rotatably articulated at the first articulation points 6 of the two toggle levers. An arm 5 of the toggle lever leads from these points 6 to the respective second rotatable articulation point 7 at the valve rods 8. At the top, the first articulation points 6 are supported by the upper arms 5 at the fixed points 10. The fixed points 10 and the first and second articulation points 6 and 7 are constructed so as to be rotatable.

Figure 8:
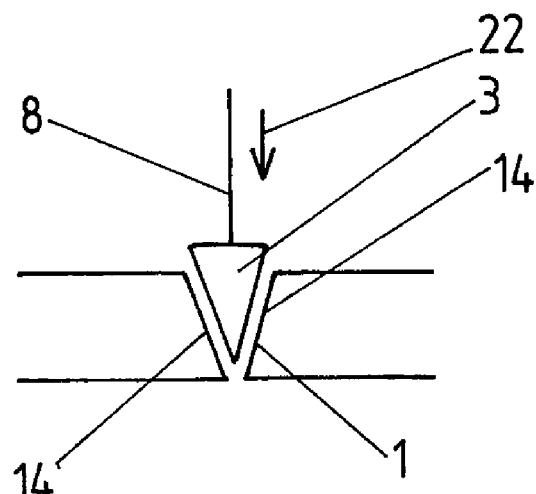
Figure 9:
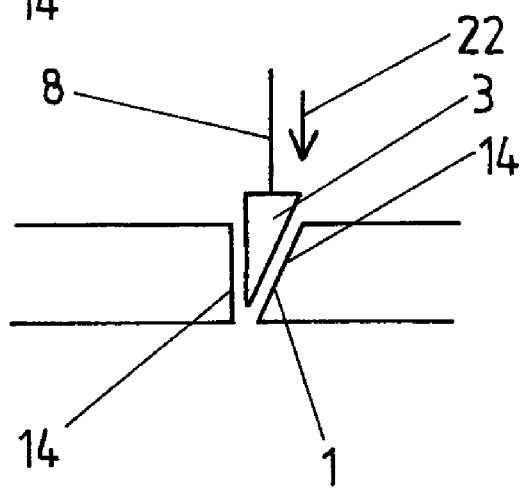
Figure 10:
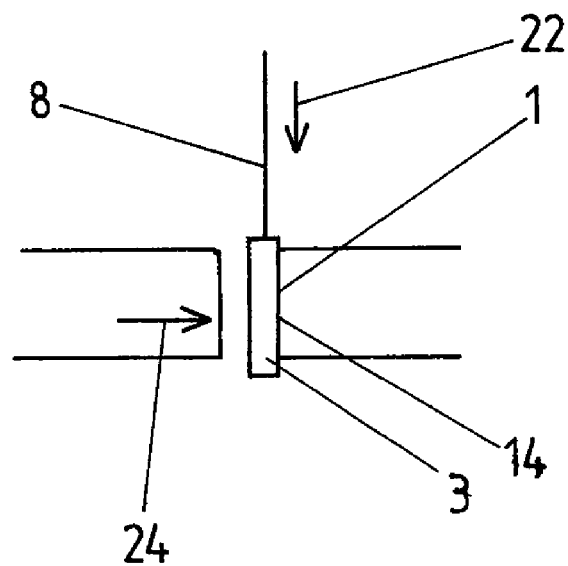

FIGS. 8 to 10 show how the closure members can be shaped and moved in alternative ways in highly schematic side views of the valve orifice 1 by way of example. In the constructional variants according to FIGS. 8 and 9, the closure members 3 are constructed in a wedge-shaped manner. The closing movement with a linear component in direction 22 can be realized according to the invention in the manner shown in the first embodiment example. Owing to the wedge shape of the closure members 3, these closure members 3 are pressed against the seat surface so as to be tight against gas when they are inserted into the corresponding wedge-shaped seat surfaces 14 in direction 22. The specific shape of the closure members 3 can be based on those disclosed in the drawings in U.S. Pat. No. 7,011,294 or U.S. Pat. No. 4,921,213, for example. As an alternative to the wedge shape, tilting members can also be used (e.g., as is shown in DE 32 24 387).

FIG. 10 schematically shows a constructional variant in which the closure member is initially moved according to the invention in direction 22 linearly downward into the area of the valve orifice 1 (i.e., in direction of the closed position). The closure member 3 is then pressed against the seat surface 14 by a movement component 24 whose direction is perpendicular to movement component 22. Another actuator may be necessary in order to realize this movement component 24. This can be realized by means of a swiveling axis and an additional piston (e.g., as is shown in U.S. Pat. No. 6,629,682).

The various constructional variants of the invention shown herein are particularly well suited for use as so-called vacuum valves. These are used to seal a valve orifice in a gastight manner in such a way that it is possible to operate under vacuum in the hollow space closed in this way. By vacuum is meant a pumping out of air or gas from the hollow space which can be realized by technical means as is applied, for example, in the machining and fabrication of semiconductor components.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 valve orifice
2 valve housing
3 closure member
4 actuator
5 arm
6 first articulation point
7 second articulation point
8 valve rod
9 valve rod guide
10 fixed point
11 line
12 actuator guide
13 linear drive
14 seat surface
15 valve plate
16 slide
17 guide portion
18 sleeve-shaped portion
19 core rod
20 ball bearing
21 push rod
22 linear movement component
23 stroke direction
24 additional movement direction
25 sleeve
26 longitudinal axis

What is claimed is:
1. A valve comprising:
a closure member for closing a valve orifice in a closed position of the closure member;

wherein the closure member can be moved in a closing process by at least one actuator, starting from a first position of maximum opening, at least along a first partial distance, the first partial distance having a linear movement component in a direction of the closure member's closed position;

wherein the actuator carries out a closing stroke, closing stroke having a linear stroke direction which moves the closure member along the linear movement component;

wherein the actuator is arranged in relation to the closure member so that an angle ranging from 0° to 180° is provided between the linear movement component of the closure member and the linear stroke direction of the actuator;

wherein at least one arm, which transmits the closing stroke of the actuator to the closure member, is rotatably connected to the actuator by a first articulation point, and is rotatably connected to the closure member by a second articulation point;

wherein the closure member is connected to at least one valve rod;

wherein the arm is rotatably connected to the valve rod at the second articulation point; and wherein the valve rod is linearly guided in a valve rod guide.

2. The valve according to claim 1;
wherein an angle ranging from 45° to 135°, or an angle ranging from 80° to 100°, is provided between the linear movement component of the closure member and the linear stroke direction of the actuator.

3. The valve according to claim 1;
wherein an angle of 90° is provided between the linear movement component of the closure member and the linear stroke direction of the actuator.

4. The valve according to claim 1;
wherein the linear movement component or the linear stroke direction is arranged parallel to a plane of the valve orifice; or
wherein the linear movement component and the linear stroke direction are arranged parallel to a plane of the valve orifice.

5. The valve according to claim 1;
wherein the closure member is held in its closed position in a self-locking manner.

6. The valve according to claim 1;
wherein the first articulation point and the second articulation point are at a distance from one another.

7. The valve according to claim 1;
wherein at least two arms are provided for transmitting the closing stroke of the actuator to the closure member;
wherein the two arms are rotatable connected to the actuator at the first articulation point; and
wherein one of the arms is rotatably connected to the closure member at the second articulation point, and the other arm is rotatably supported at a fixed point.

8. The valve according to claim 1;
wherein the arm can be moved into the closed position of the closure member over a top dead center and remain in a self-locking manner in the position moved over the top dead center.

9. The valve according to claim 1;
wherein the actuator is guided linearly by an actuator guide.

10. The valve according to claim 1;
wherein the actuator has a linear drive.

11. The valve according to claim 1;
wherein the valve is a slide valve in which the closure member can slide in front of the valve orifice with a movement having a linear component.

12. The valve according to claim 1;
wherein the closure member carries out exclusively a linear movement with only one movement component during the closing process.

13. The valve according to claim 1;
wherein, after the closure member moves from the first position of maximum opening along the linear movement component, the closure member is then pressed against at least one sealing seat surface of the valve to fully achieve the closed position by moving along another movement component oriented at an angle ranging from 0° to 180° in relation to the linear movement component.

14. The valve according to claim 1;
wherein the closure member is rigidly connected to the at least one valve rod.

15. The valve according to claim 1;
wherein the actuator has an electromagnetic linear drive.

16. The valve according to claim 1, which is provided for closing the valve orifice so as to be tight against gas.

17. A valve comprising:
a closure member for closing a valve orifice in a closed position of the closure member;
wherein the closure member can be moved in a closing process by at least one actuator, starting from a first position of maximum opening, at least along a first partial distance, the first partial distance having a linear movement component in a direction of the closure member's closed position;
wherein the actuator carries out a closing stroke, closing stroke having a linear stroke direction which moves the closure member along the linear movement component;
wherein the actuator is arranged in relation to the closure member so that an angle ranging from 0° to 180° is provided between the linear movement component of the closure member and the linear stroke direction of the actuator;
wherein at least one arm, which transmits the closing stroke of the actuator to the closure member, is rotatably connected to the actuator by a first articulation point, and is rotatably connected to the closure member by a second articulation point;
wherein the closure member is connected to at least one valve rod;
wherein the arm is rotatable connected to the valve rod at the second articulation point; and
wherein the valve rod is linearly guided in a gastight valve rod guide.

* * * * *